(12) United States Patent
Robineau

(10) Patent No.: US 6,512,462 B1
(45) Date of Patent: Jan. 28, 2003

(54) DUAL FUNCTION RADIO FREQUENCY REMOTE CONTROL SYSTEM FOR A MOTOR VEHICLE

(75) Inventor: José Robineau, St. Genevieve des Bois (FR)

(73) Assignee: Valeo Electronique (FR)

( * ) Notice: Subject to any disclaimer, the term of this patent is extended or adjusted under 35 U.S.C. 154(b) by 631 days.

(21) Appl. No.: 08/937,512

(22) Filed: Sep. 25, 1997

(30) Foreign Application Priority Data

Sep. 27, 1996 (FR) ............................................ 96 11796

(51) Int. Cl.[7] ................................................. H04Q 1/00
(52) U.S. Cl. .............. 340/825.72; 341/176; 340/825.69
(58) Field of Search ...................... 340/825.72, 825.69, 340/825.04, 539, 426; 341/176; 455/95, 99

(56) References Cited

U.S. PATENT DOCUMENTS

| 5,379,033 A | 1/1995 | Fuji et al. | |
|---|---|---|---|
| 5,543,776 A | * 8/1996 | L'Espereance et al. | ..... 340/426 |
| 5,600,323 A | 2/1997 | Boschini | |

FOREIGN PATENT DOCUMENTS

| DE | 42 26 053 | 2/1993 |
|---|---|---|
| EP | 0 440 974 | 8/1991 |
| EP | 0 629 758 | 12/1994 |

OTHER PUBLICATIONS

French Search Report dated Jun. 25, 1997.

* cited by examiner

*Primary Examiner*—Michael Horabik
(74) *Attorney, Agent, or Firm*—Morgan & Finnegan, LLP

(57) ABSTRACT

A dual function radio frequency remote control system has a dual function portable emitter, and a receiver carried on a motor vehicle. The signal emitted by the emitter contains a function code in at least two parts at different power levels, and the receiver is adapted to control at least two functions of the vehicle selectively according to the power level of the received signal. If the receiver identifies both parts of the function code, the doors are unlocked. If only one part is received the doors are not unlocked, but the courtesy light or flashing indicators are switched on to enable the vehicle to be located.

20 Claims, 2 Drawing Sheets

DUAL FUNCTION RADIO FREQUENCY REMOTE CONTROL SYSTEM FOR A MOTOR VEHICLE

FIELD OF THE INVENTION

The present invention relates to methods and apparatus for the dual function radio frequency remote control of functions of a motor vehicle. In this Application such an apparatus will be referred to as a remote control system.

BACKGROUND OF THE INVENTION

Dual function remote control systems for motor vehicles are known, for example, from U.S. Pat. No. 5,420,568 and European patent specification EP 0 524 424 A. The term "dual function" refers to the fact that the remote control system controls more than one function of the vehicle (not necessarily only two functions), for example, switching on a courtesy light of the vehicle, or some other function to enable the vehicle to be located from a distance, and/or unlocking of the doors of the vehicle. In the above mentioned patent specifications, such remote control systems enable an operator to actuate various functions of the vehicle according to how far away from the vehicle the operator is at the time. In particular, the said specifications disclose the use of the system to actuate the illumination of the courtesy lamp, and also unlocking of the doors, but with the latter only being able to take place when the operator of the remote control system is very close to the vehicle.

In U.S. Pat. No. 5,420,568, the emitter of the remote control system transmits to a reception unit carried on the vehicle an encrypted message and a function code, by means of a signal, the emission power of which is at a nominal power level which is the same regardless of the function to be commanded. The receiver unit then decides, according to the power level which it receives (and therefore according to the distance between the emitter and the vehicle) whether or not to authorize one or other of the actions signalled by the function code.

This is illustrated in FIG. 1 of the drawings of the present Application. FIG. 1 is a diagram representing the power level in the signal received by the receiver from the emitter, expressed at three different distances between the emitter and the receiver, all for a given signal.

With reference to FIG. 1, when the operator is quite a long way away from the vehicle, the power level in the signal received by the receiver is lower than the reception threshold SR of the receiver, which therefore does not give a command to activate any function of the vehicle. This is called an "out of zone" situation.

When the operator is close to the vehicle, there is a "near zone" situation, in which the signal received by the receiver is at a power level which is not only greater than the reception threshold SR, but is also greater than another threshold, and referred to as a zone threshold. In this near zone situation, the receiver authorizes, that is to say it causes the activation of, locking or unlocking of the doors of the vehicle, denoted "action 1".

Beyond the near zone, there is a "far zone" in which the received signal is at a power level which is higher than the reception threshold SR but lower than the zone threshold. In this far zone, the receiver will not allow the doors to be locked or unlocked, but it will on the other hand cause at least one other function to be activated to enable the operator more easily to locate the vehicle. Examples of such functions are switching on the courtesy light of the vehicle, or operation of flashing indicators. This is denoted "action 2".

However, such a remote control system makes it necessary to provide in the receiver an electronic device for comparing the power in the received signal with a given zone threshold value, and this makes the receiver more complicated.

In the remote control system disclosed in European patent specification No. EP 0 524 424 A, the emitter has different actuating buttons for the two functions which are to be commanded. The function codes transmitted are at different power levels according to which button is actuated. One of the function codes is emitted at a nominal power level, and the other is emitted at a reduced power level. The receiver does or does not receive the emitted code, depending on the distance between the emitter and the vehicle. In that arrangement, the decision as to the type of function to be commanded is made at the emitter.

The operation of this latter type of system is illustrated in FIG. 2 of the drawings, which is the same type of diagram as FIG. 1. Thus in FIG. 2, in the near zone, the codes corresponding to the two functions are both received by the receiver on the vehicle, which therefore takes both Action 1 and Action 2, and activates both of the functions corresponding to those two codes. Again, in the out of zone situation when the operator is too far from the vehicle, so that both function codes emitted by the emitter are below the reception threshold SR, no function is controlled at all. In FIG. 2 in the "far zone" situation, only the signal emitted at the nominal power level is received, so that the receiver activates only the function that corresponds to that signal, i.e. only Action 2 is taken.

The configuration represented in FIG. 2 does, however have the drawback that it is not "transparent" for the user, because the user must choose which function he wants to control, and must operate the remote controller accordingly. It follows that the housing of the remote control emitter carried by the user must have at least two touch elements such as a push button, with one touch element being associated with each of the functions to be controlled. This increases both the size and the cost of the portable unit carried by the user.

DISCUSSION OF THE INVENTION

The invention proposes a novel remote control system which overcomes the above mentioned disadvantages.

According to the invention in a first aspect, a method of performing a dual function radio frequency remote control operation for a motor vehicle is characterised in that the emitted signal has a function code in at least two parts at different power levels, functions of the motor vehicle being controlled selectively according to the power levels of the said different parts in the signal as received.

Such a remote control method is "transparent" to the user, because the same signal is used for the selective control of one or other of the functions of the vehicle.

Preferably, the said functions are controlled selectively according to whether one and/or another of the said parts of the function code is or is not received by the receiver of the remote control system. Thus, it is the reception, or the absence of reception, of the different parts of the function code that selectively activates the various functions of the vehicle. Accordingly, application of this method does not call for the provision of any electronic circuitry for comparing the power levels of the different parts of the function code with a given zone threshold.

Preferably, if each of the said parts of the function code is identified on receipt of the signal, unlocking of the doors of the vehicle is authorized, and if only one of the said parts is received, the said unlocking is not authorizes, but a function to permit the vehicle to be located, such as activation of the courtesy light or flashing indicators of the vehicle, is authorizes.

According to the invention in a second aspect, a dual function radio frequency remote control system comprising a dual function radio frequency signal emitter, and a receiver carried by a motor vehicle, is characterised in that the emitter includes means for emitting a signal, the function code of which consists of at least two parts at different power levels, the receiver comprising means for selectively commanding functions of the vehicle according to the power level of the said different parts of the function code in the signal as received.

The receiver preferably includes means for selectively commanding the said functions according to whether one and/or another of the said parts of the function code is or is not received.

In a preferred embodiment of the invention, if the receiver identifies each of the said parts of the function code, it authorises unlocking of the doors of the vehicle, and if it only receives one of the said parts, it does not authorise the said unlocking but controls a function enabling the vehicle to be located, such as activation of the courtesy light or flashing indicators of the vehicle.

In a third aspect, the invention provides an emitter and a receiver, as defined above, for such a remote control system.

In a fourth aspect of the invention, a motor vehicle is equipped with a remote control system according to the above mentioned second aspect of the invention.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
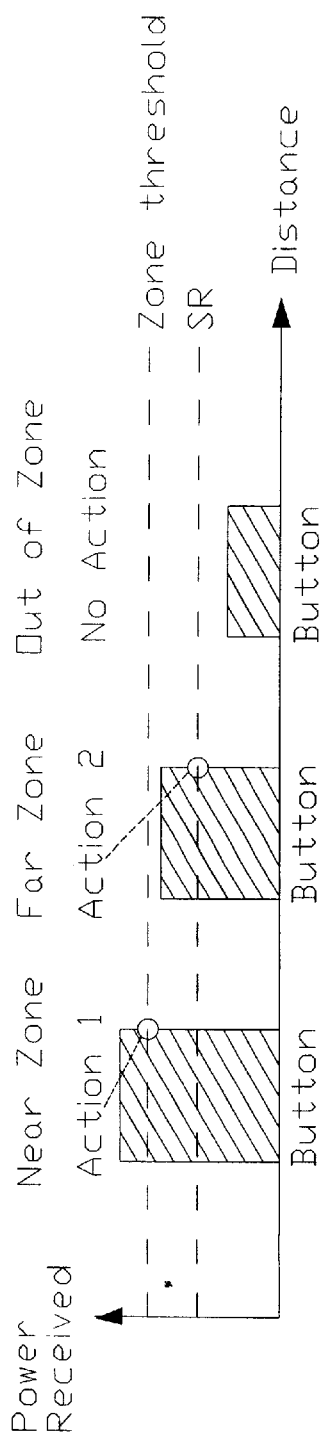
FIGS. 1 and 2, already described above, are diagrams illustrating the operation of two types of remote control system in the prior art.
Figure 2:
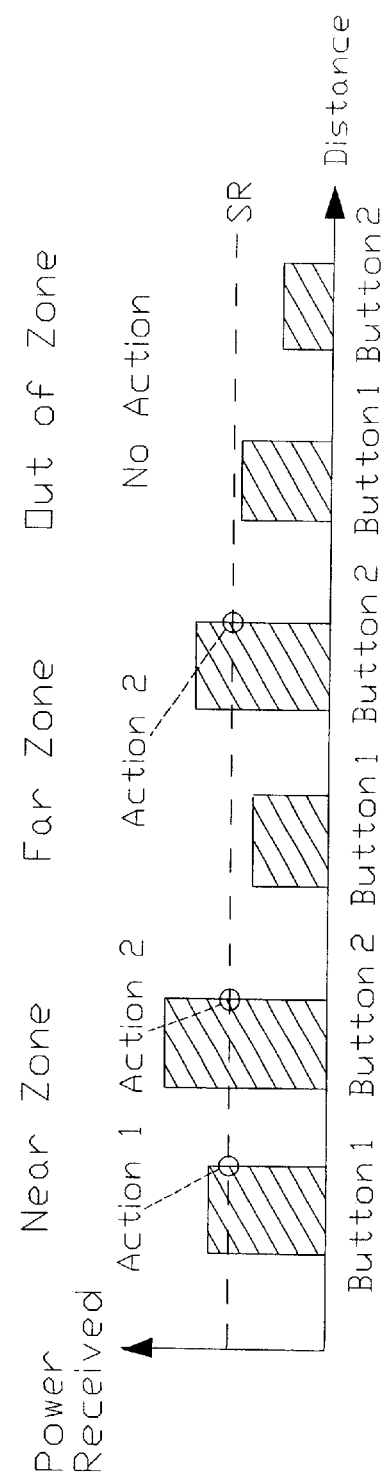
Figure 3:
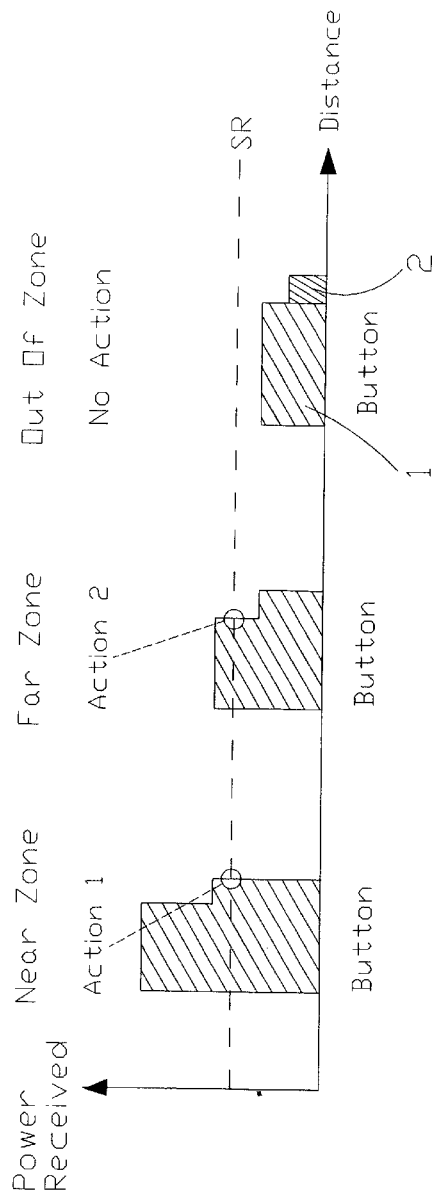
FIG. 3 is a similar diagram illustrating the operation of a remote control system in one possible embodiment of the invention.

With reference to FIG. 3, the remote control system the operation of which is shown in FIG. 3, has a portable remote emitter which emits a control signal having a function code that consists of at least two distinct parts (effectively corresponding to different codes); these two parts are at different power levels. For example, a first part, denoted as part I, is emitted at nominal power. It is followed by a second part, part II, which is emitted at a reduced power level.

The receiver of the remote control system is carried by the vehicle, and processes the signal which it receives from the remote emitter in the following way. If the receiver receives neither of the two parts of the function code, that is to say if the two parts of the function code received are at a power level below the reception threshold SR, the operator, carrying the remote controller, is in a zone outside the range of reception of the remote controller, and no function of the vehicle can be activated. This is the "out of zone" situation already defined above.

If on the other hand the receiver identifies both parts of the function code in the received signal, that is to say both parts I and II are present in the received signal, at a power level above the reception threshold SR, the receiver deduces that the operator is in the immediate proximity of the vehicle, and authorises action, for example to lock or unlock the doors. This is the "near zone" situation.

If the reception threshold SR is between the two power levels of the two respective parts of the function code in the received signal, the receiver deduces that the operator is too far away from the vehicle to permit the system to authorise locking or unlocking of the doors, but that he is nevertheless close enough to the vehicle for auxiliary functions to be authorised. An example of such an auxiliary function is that of switching on the courtesy light and/or the flashing indicators in the vehicle. This is the "far zone" situation.

The remote controller thus has, for the user, "transparent" operation, while the user is able to control more than one function by operating a single button. In addition, the electronic circuitry of the receiver is extremely simple, because it is not necessary to include in it any electronic means for comparing the power level received with predetermined threshold values so as to enable different zones to be distinguished from each other. The only threshold made use of is the reception threshold SR.

Of course, if the size of the housing of the emitter is not critical, this transparency of the remote controller does not prevent the operator being able to have at his disposal more than one different touch element (such as buttons) on the housing of the remote controller, for enabling him to select the type of operation which he requires for the remote controller, such as dual function operation of the type already described above, or only the remote control of the locking and unlocking of the doors of the vehicle.

A radio frequency remote control system adapted to operate according to the method just described comprises an emitter which includes means for emitting a signal in which the function code of this signal consists of at least two parts at different power levels, together with a receiver which selectively commands the functions of the vehicle according to whether or not it receives one or other of these different parts of the function code. The actual construction of such an emitter and such a receiver are of course well within the scope of competence of the ordinary person skilled in this technical field.

Figure 4:
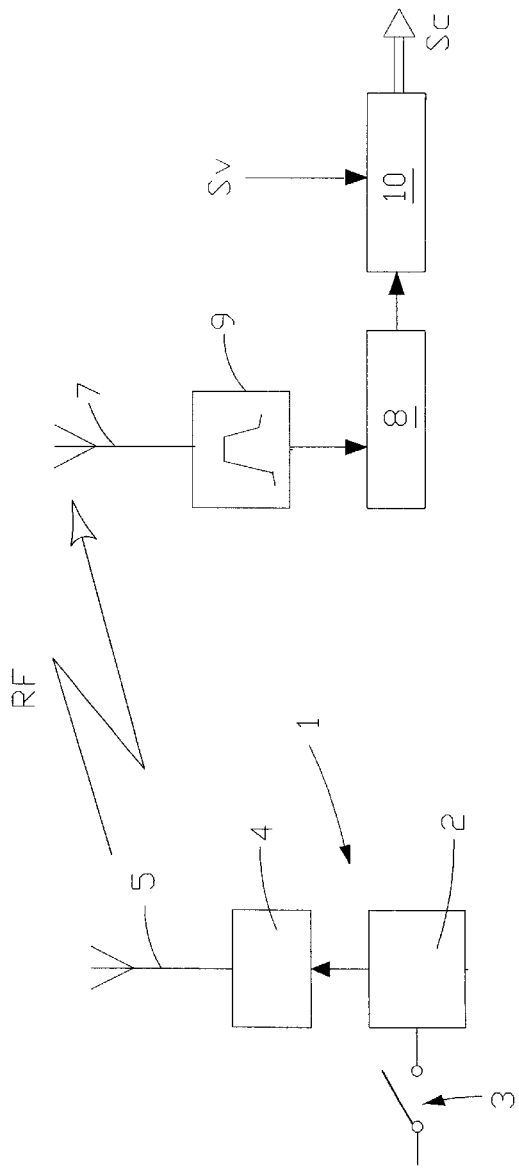
FIG. 4 is a diagram in block form, showing a remote control system in accordance with the invention.

Reference is now made to FIG. 4, which shows, on the left, the emitter 1, and on the right the receiver 6 carried by the vehicle, the emitter 1 being carried by the operator.

The emitter 1 includes for example a processing unit 2 which generates the coded signal when the operator actuates a push button 3 in the housing of the emitter 1. The processing unit 2 is connected to a radio frequency emission stage 4, which emits the signals generated by the unit 2 through an emission antenna 5. The emitted signal is a modulated radio frequency signal.

The receiver 6 has a receiving antenna 7 which is connected, through a band pass filter 9 centred on the emission frequency $F_0$, to a unit 8 which is a receiving and radio frequency demodulating unit. The output signal from the unit 8 is passed to a decoding unit 10 which verifies the code carried by the received signal.

The unit 10 gives an output signal $S_C$ for activating the various functions in the vehicle associated with the received signal, according to which of the function codes (i.e. the different parts of the function code) have been received in the emitted signal, and also having regard to data carried by the vehicle relating to the locked or unlocked state of the doors of the vehicle.

The emitted signal can of course carry other information besides that relating to the control of locking and unlocking of the doors. For example, it may carry "comfort information".

What is claimed is:

1. A method of performing a dual function radio frequency remote control operation for a motor vehicle having a remote control system with a receiver and a remote emitter, the method comprising:

causing the emitter to emit a signal having a function code in at least two parts at different power levels;

receiving the signal by means of the receiver; and selectively commanding functions of the vehicle according to the power level of said parts of the function code in the signal received by the receiver.

2. A method according to claim 1, wherein the step of selectively commanding vehicle functions comprises:

selecting between said functions according to the parts of the function code that are present in the received signal; and commanding said functions.

3. A method according to claim 2, for a vehicle having doors, first function means for effecting a vehicle function by automatically locking and unlocking the doors, and at least one second function means for effecting at least one further function enabling the vehicle to be located, and wherein, if the receiver identifies each of the parts of the function code in the received signal, the receiver activates the first function means to unlock the doors, but wherein, if the receiver identifies only one said part in the received signal, the receiver fails to activate the first function means but activates the second function means.

4. A dual function radio frequency remote control system comprising:

a portable dual function emitter; and a receiver carried by a motor vehicle;

wherein the emitter includes means for emitting a signal having a function code in at least two parts at different power levels, and the receiver includes means for selectively controlling functions of the vehicle according to the power level of such of said parts as may be present in the signal as received by the receiver.

5. A system according to claim 4, wherein the selective control means of the receiver selects the functions according to which, if any, of the parts of the function code are present in the signal as received by the receiver.

6. A system according to claim 4, for a vehicle having at least one door, first function means connected to the receiver for automatically locking and unlocking said door, and second function means connected to the receiver for enabling the vehicle to be located, wherein the selective control means of the receiver activates said first function means, and to cause said unlocking to take place, if the receiver identifies each of the parts of the function code in the received signal, the selective control means activating said second function means if only one said part of the function code is present in the received signal.

7. An emitter for a system according to claim 4, including means for emitting a signal having a function code in at least two parts at different power levels.

8. A receiver for a system according to claim 4, including means for selectively controlling different functions of the vehicle according to the power level present in the signal received by the receiver.

9. A motor vehicle equipped with a remote control system according to claim 4.

10. A method comprising:

emitting a control signal having a function code with at least two parts, each part being at a different power level;

receiving the signal; and actuating selectively at least two functions according to the power level of the parts of the function code received.

11. A method according to claim 10, wherein the function code has two parts; and wherein the step of actuating selectively at least two functions comprises:

actuating a first function when two parts of the function code are received;

actuating a second function when one part of the function code is received.

12. A method according to claim 11, for remotely controlling at least two functions of a motor vehicle, wherein the first function is indicating the location of the motor vehicle, and the second function is unlocking an at least one door.

13. A device comprising:

an emitter configured to emit a signal having a function code in at least two parts, each part being at a different power level;

a receiver configured to receive the signal; and a controller for selectively actuating at least two functions according to the power level of the parts of the function code received by the receiver.

14. The device according to claim 13, wherein the controller actuates functions corresponding to the parts of the function code received, regardless of signal power level.

15. A motor vehicle equipped with a device according to claim 13.

16. A motor vehicle according to claim 15, wherein the controller is for unlocking an at least one door and for enabling the vehicle to be located, and wherein the controller unlocks the at least one door only when at least two parts of the function code are received, and actuates vehicle locating means when one part of the function code is received.

17. A motor vehicle according to claim 16, wherein the vehicle locating means is a courtesy light of the vehicle.

18. A motor vehicle according to claim 16, wherein the vehicle locating means is a flashing indicator of the vehicle.

19. A motor vehicle equipped with a device according to claim 13;

wherein the controller actuates functions corresponding to the parts of the function code received, regardless of signal power level;

wherein the controller unlocks the at least one door only when at least two parts of the function code are received, and actuates a courtesy light of the vehicle when one part of the function code is received.

20. A method comprising:

in response to a single user activation, emitting from a dual function radio frequency remote controller a single transmission having a high power part and a low power part; and receiving the transmission at a motor vehicle and selectively commanding a plurality of functions of the vehicle according to the power level of the parts of the transmission received.

* * * * *